US007332887B2

(12) United States Patent
Ryuzaki

(10) Patent No.: US 7,332,887 B2
(45) Date of Patent: Feb. 19, 2008

(54) IMAGE FORMING APPARATUS

(75) Inventor: Teruyo Ryuzaki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 105 days.

(21) Appl. No.: 11/406,423

(22) Filed: Apr. 19, 2006

(65) Prior Publication Data
US 2007/0040530 A1   Feb. 22, 2007

(30) Foreign Application Priority Data
Aug. 17, 2005  (JP)  ............... 2005-236740

(51) Int. Cl.
*G05B 19/40* (2006.01)
(52) U.S. Cl. ............ 318/685; 318/696; 318/600; 347/167; 347/168
(58) Field of Classification Search .......... 318/685, 318/696, 600; 347/167, 168
See application file for complete search history.

(56) References Cited

U.S. PATENT DOCUMENTS

| 5,751,303 A * | 5/1998 | Erickson et al. ............. 347/16 |
| 6,175,716 B1 * | 1/2001 | Toyama et al. ............. 399/384 |
| 6,529,644 B2 * | 3/2003 | Ito et al. ..................... 382/309 |
| 2004/0057751 A1 * | 3/2004 | Matsuo et al. .............. 399/227 |
| 2004/0146331 A1 * | 7/2004 | McNestry et al. ........ 400/615.2 |

FOREIGN PATENT DOCUMENTS

| JP | 7-064365 | 3/1995 |
| JP | 2003-284391 | 10/2003 |

* cited by examiner

*Primary Examiner*—Rina I. Duda
(74) *Attorney, Agent, or Firm*—Morgan, Lewis & Bockius LLP

(57) ABSTRACT

An image forming apparatus includes a stepping motor that drives a rotor by rotating in accordance with an input of a drive pulse, a drive pulse profile storage portion that stores the drive pulse profiles corresponding to temporal changes of the drive pulse inputted in the stepping motor at starting, the drive pulse profile storage portion storing at least a first load profile corresponding to the first drive pulse profile for a first load driving the rotor and a second load profile corresponding to the second drive pulse profile for a second load driving the rotor, which is larger than the first load and a profile setting portion that sets the drive pulse profile in accordance with the load for driving the rotor, as the drive pulse profile of pulses inputted into the stepping motor, among the drive pulse profiles stored in the drive pulse profile storage portion.

7 Claims, 10 Drawing Sheets

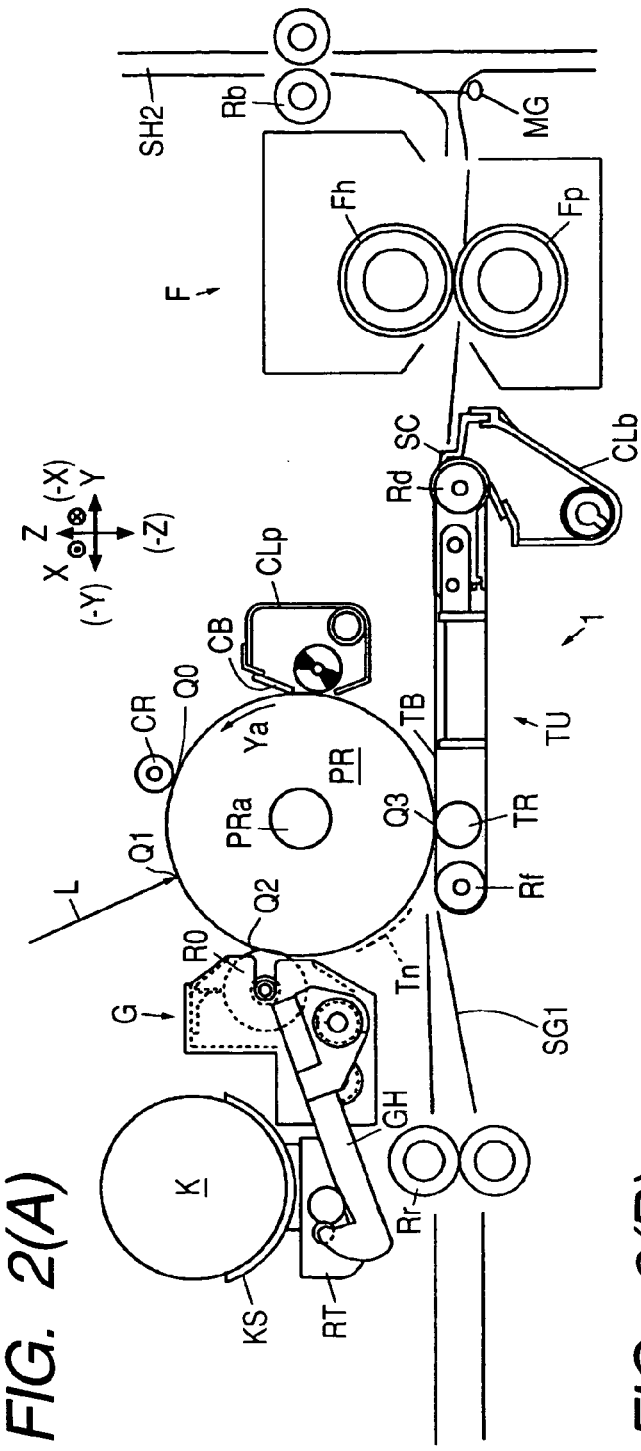
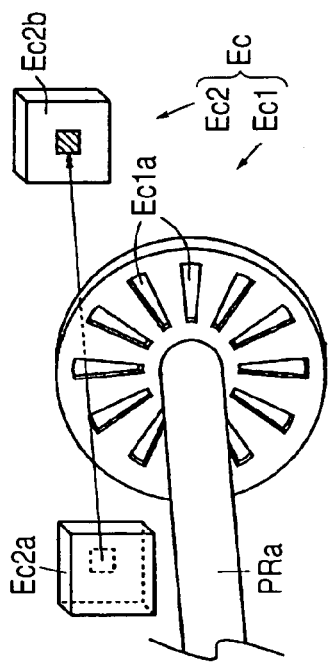
FIG. 2(A)
FIG. 2(B)

START-UP PROFILE EXAMPLE OF STEPPING MOTOR

MOTOR SPEED PROFILE EXAMPLE AT THE
START-UP TIME OF STEPPING MOTOR (WHEN THE DRIVE LOAD OF STEPPING MOTOR IS HEAVY)

(WHEN THE DRIVE LOAD OF STEPPING MOTOR IS LIGHT)

(WHEN THE DRIVE LOAD OF STEPPING MOTOR IS LIGHT (STEP-OUT))

IMAGE FORMING APPARATUS

BACKGROUND

1. Technical Field

The present invention relates to an image forming apparatus such as a copying machine, a printer, a FAX and a composite machine having two or more of their functions, and more particularly, to an image forming apparatus using a stepping motor (often called a step motor or a pulse motor) as the motor for driving a rotor.

2. Related art

The related image forming apparatus has a rotor that is driven and rotated such as a sheet conveying device, a photosensitive body, a developing unit, a transferring unit, a fixing unit, or an intermediate transfer belt, and a DC motor or a stepping motor is employed as the motor for driving the rotor. The stepping motor is the motor for driving the rotation in accordance with the input of pulses, and suitably employed for controlling precisely the rotation of the rotor.

However, the stepping motor has a problem that a so-called step-out phenomenon occurs in which the rotation of the motor does not follow an input pulse train when the rotation load of the rotor is large.

SUMMARY

The present invention has been made in view of the above circumstances and provides an image forming apparatus.

According to an aspect of the invention, an image forming apparatus comprises a stepping motor for driving a rotor by rotating in accordance with an input of a drive pulse, a drive pulse profile storage portion for storing the drive pulse profiles that are temporal changes of the drive pulse inputted in starting the stepping motor, and storing at least a light load profile that is the drive pulse profile inputted when the load for driving the rotor is light and a heavy load profile that is the drive pulse profile inputted when the load for driving the rotor is heavy; and a profile setting portion for setting the drive pulse profile in accordance with the load for driving the rotor as the drive pulse profile of pulses inputted into the stepping motor from among the drive pulse profiles stored in the drive pulse profile storage portion.

BRIEF DESCRIPTION OF THE DRAWINGS

Embodiments of the present invention will be described in detail based on the following figures, wherein

FIGS. 2(A) and (B) are partly enlarged explanatory views of the image forming apparatus, wherein FIG. 2(A) is a partly enlarged view of a toner image forming part in the image forming apparatus as shown in FIG. 1 and FIG. 2(B) is an enlarged explanatory view of an encoder;

FIGS. 5 (A) to (C) are an explanatory view showing an example of speed change at the time of start-up when a heavy load profile is employed as the drive pulse profile for driving the motor in the stepping motor according to the first embodiment, wherein

DETAILED DESCRIPTION

Figure 1:
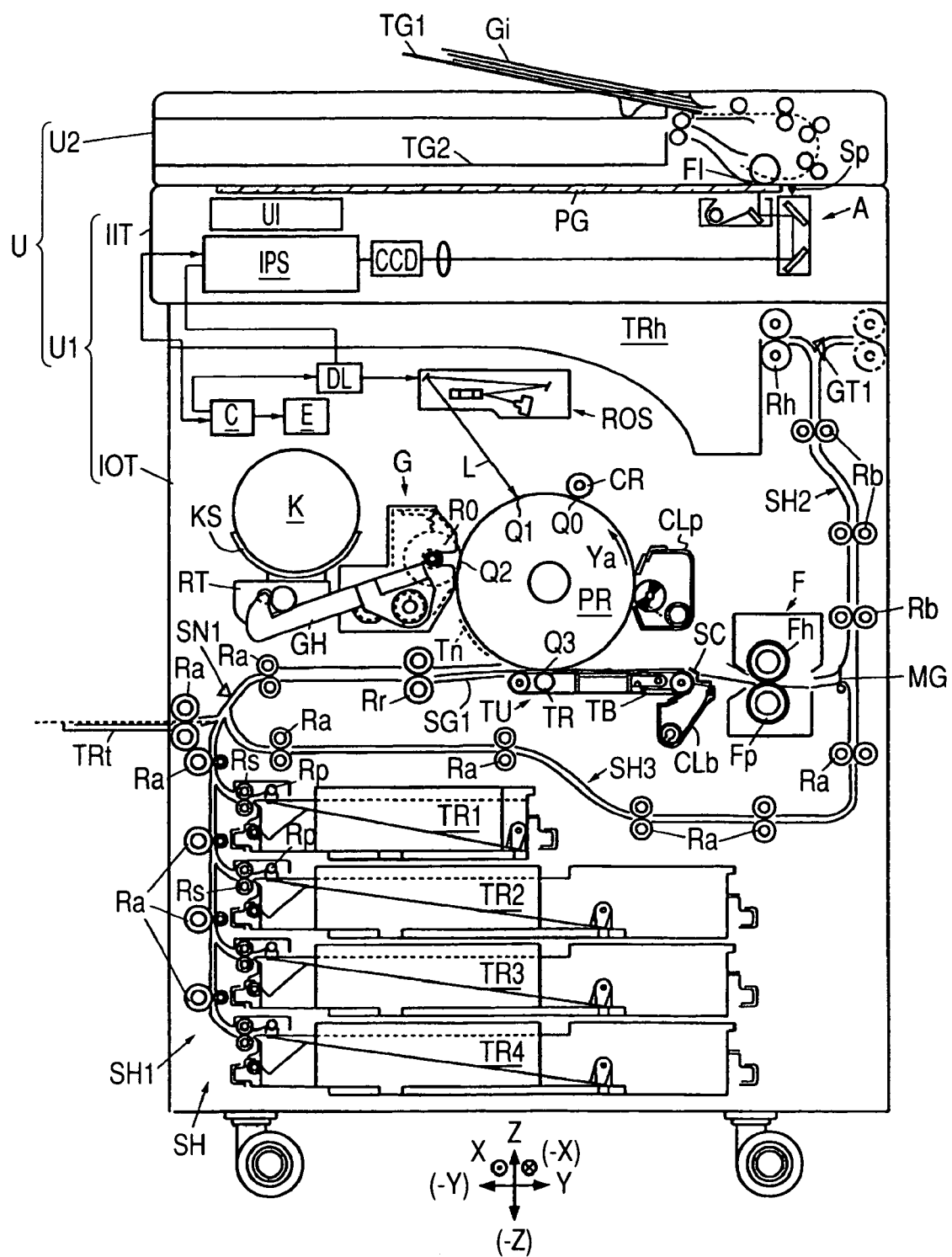
FIG. 1 is an overall explanatory view of an image forming apparatus according to a first embodiment of the present invention.

The present invention will be described below with reference to the drawings, but the invention is not limited to the following embodiments.

To facilitate the understanding of the following explanation, it is assumed in the drawings that the cross direction is the X axis direction, the longitudinal direction is the Y axis direction, and the vertical direction is the Z axis direction, and the direction or side as indicated by the arrow X, -X, Y, -Y, Z, or -Z is forward, backward, rightward, leftward, upward, or downward, in other words, fore side, back side, right side, left side, upper side or lower side.

In the drawings, a sign "●" within "o" portion the arrow directed from the back to front of the paper, and a sign "×" within "o" portion the arrow directed from the front to back of the paper.

First Embodiment

Example 1

FIG. 1 is an overall explanatory view of an image forming apparatus according to an first embodiment of the invention.

In FIG. 1, a copying machine U as the image forming apparatus comprises a digital copying machine main body U1 as an image forming apparatus main body having a platen glass (transparent original plate) PG on the upper face, and an automatic original conveying device (automatic document feeder, ADF) U2 that is mounted demountably on the platen glass PG.

The automatic original conveying device U2 has an original paper feed tray TG1 on which plural originals Gi to be copied are laid. Each of plural originals Gi laid on the original paper feed tray TG1 is sequentially passed through a copying position on the platen glass PG, and exhausted into an original output tray TG2.

The copying machine main body U1 has a UI (user interface), an IIT (image input terminal) as an image reader and an IOT (image output terminal) as an image recording operation part that are serially disposed under the platen glass PG, and an IPS (image processing system) provided in the IIT or IOT.

The IIT as the original reader disposed under the transparent platen glass PG on the upper face of the copying machine main body U1 has an exposure system registration sensor (platen registration sensor) Sp disposed at a platen registration position (OPT position), and an exposure optical system A.

The exposure optical system A is controlled to be moved or stopped based on a detection signal of the exposure system registration sensor Sp, and always stopped at a home position.

In an ADF mode where the automatic original conveying device (automatic document feeder) U2 is employed in copying, the exposure optical system A is stopped at the home position and exposes each original Gi sequentially passing through a copying position FI on the platen glass PG.

In a platen mode where the original Gi is manually placed on the platen glass PG in copying by the operator, the exposure optical system A exposes and scans the original on the platen glass PG while being moved.

A reflected light from the exposed original Gi passes through the exposure optical system A and is converged on a CCD (solid-state image pickup device). The CCD converts the reflected light of original converged on its image pickup plane into an electrical signal.

The IPS converts a read image signal inputted from the CCD of the IIT into a digital image write signal and outputs it to a laser drive signal output device DL of the IOT.

The laser drive signal output device DL outputs a laser drive signal according to the input image data to an ROS (optical writer scanner, or image writer).

FIG. 2 is a partly enlarged explanatory view of the image forming apparatus, wherein FIG. 2A is a partly enlarged view of a toner image forming part in the image forming apparatus of FIG. 1, and FIG. 2B is an enlarged explanatory view of an encoder.

A photosensitive body (image bearing body, rotor) PR disposed under the ROS is rotated in a direction of the arrow Ya around a rotation shaft PRa. In FIG. 2B, the encoder (rotation detection sensor) Ec is provided around the rotation shaft PRa. The encoder Ec has a disk member EC1 firmly supported on the rotation shaft PRa and formed with a number of radiant slits Ec1a at an equal interval. An optical sensor Ec2 having a light emitting part Ec2a and a light receiving part Ec2b is disposed across the disk member Ec1. Accordingly, if the photosensitive body PR is rotated, the disk member Ec1 is also rotated, so that the light receiving part Ec2b detects that a detection light emitted from the light emitting part Ec2a passes through the slit Ec1a or is shielded by a light shielding part Ec1b between the slits Ec1a. Accordingly, the output result of the light receiving part Ec2 during the rotation of the photosensitive body PR is pulse-like. The encoder Ec is composed of the disk member Ec1 and the optical sensor Ec2.

The surface of the photosensitive body PR is charged by a charging roll (charge roll) CR in a charging area Q0, and exposed and scanned by a laser beam L of the ROS (image writer) in a latent image write position Q1 to form an electrostatic latent image. The formation of latent image by the laser beam L onto the photosensitive body PR is started in a certain time after a paper sensor SN1 senses the leading edge of the paper. The surface of the photosensitive body PR on which the electrostatic latent image is formed is rotated and moved to successively pass through a development area Q2 and a sheet transfer area Q3.

A developing unit G for developing the electrostatic latent image in the development area Q2 develops the electrostatic latent image passing through the development area Q2 into a toner image by carrying a developer containing a toner of−(minus) charge polarity and a carrier of plus charge polarity to the development area Q2 using a development roll R0. The toner image on the surface of the photosensitive body PR is carried to the sheet transfer area Q3.

A developer cartridge K for refilling the developer consumed in the developing unit G is removably mounted in a cartridge mounting member KS. The developer within the developer cartridge K is agitated within a reserve tank RT, and carried into the developing unit G by the developer carrying member GH. The constitution in which the developer within the developer cartridge K removably mounted on the cartridge mounting member KS is carried into the developing unit G by the reserve tank RT and the developer carrying member GH may be realized by taking various forms, as described in JP-A-2004-290782 filed by the present applicant, for example.

A transferring unit (belt module) TU opposed to the photosensitive body PR in the sheet transfer area Q3 is supported by the belt support rolls (Rf, Rd) having a driven roll Rf and a driving roll Rd, and has a transfer belt TB, a bias roll (transfer roll) TR, a peeling pawl SC, and a belt cleaner CLb. The bias roll TR is a member for transferring the toner image on the surface of the photosensitive body PR onto the sheet S, and supplied with a transfer voltage of reverse polarity to the toner charging polarity for developer employed in the developing unit G from a power supply circuit E. The power supply circuit E is controlled by a controller C.

The sheets S contained within the paper feed trays TR1 to TR4 are conveyed on a sheet supply passage SH1 to the sheet transfer area Q3. That is, the sheets S in each of the trays TR1 to TR4 are picked up at a predetermined timing by a pickup roll Rp, separated one by one by a selvedge roll Rs and conveyed to a registration roll Rr by a plurality of conveying rolls Ra. Also, the sheet S supplied from a manual insertion tray TRt is conveyed to the registration roll Rr by the conveying rolls Ra.

The sheet S conveyed to the registration roll Rr is conveyed from a pre-transfer sheet guide SG1 to the transfer belt TB of the transferring unit TU at a timing when the toner image on the photosensitive body PR is moved to the sheet transfer area Q3. The transfer belt TB conveys the conveyed sheet S to the sheet transfer area Q3.

The toner image Tn developed on the surface of the photosensitive body PR is transferred onto the sheet S in the sheet transfer area Q3 by the bias roll TR. After transfer, the surface of the photosensitive body PR is cleaned by the photosensitive body cleaner CLp to remove the residual toner, and recharged by the charging roll CR. The photosensitive body cleaner CLp of the first embodiment has a cleaning blade (rotational load member) CB for scraping the residual toner by contacting the photosensitive body PR.

The sheet S, on which the toner image is transferred in the sheet transfer area Q3 by the bias roll TR, is peeled from the surface of the transfer belt TB by the sheet peeling pawl SC on the downstream side of the sheet transfer area Q3. After the toner image is heated and fixed by the fixing unit F having a heating roll Fh and a pressure roll Fp, the peeled sheet S is passed through a Mylar gate MG made from an elastic sheet and conveyed to forward and backward rotatable conveying rolls Rb on a sheet output passage SH2. The Mylar gate MG is elastically deformed to direct the sheet S passed through the fixing unit F to the sheet output passage SH2.

The sheet S to be exhausted into the paper output tray TRh is conveyed on the sheet output passage SH2 where plural forward and backward rotatable conveying rolls Rb are disposed. A switching gate GT1 is disposed at a downstream end of the sheet output passage SH2. The switching gate GT1 is switched to exhaust the conveyed sheet S into the paper output tray Rh or an after-treatment device, not shown, if the after-treatment device (not shown) is connected to the image forming apparatus. When the after-treatment device is not connected, the switching gate GT1 exhausts the sheet S conveyed to the downstream end of the sheet output passage SH2 into the paper output tray TRh.

The forward and backward rotatable conveying rolls Rb are reversely rotated, immediately before the trailing edge of the one-side recorded sheet S passes through the conveying roll Rb, to switch back the one-side recorded sheet, if the one-side recorded sheet is conveyed to make the perfect printing. The Mylar gate MG directs the sheet S switched back by the conveying roll Rb to a sheet cyclic conveying passage SH3. The one-side recorded sheet S conveyed on the sheet cyclic conveying passage SH3 is turned over and fed into the transfer area Q3 again. For the one-side recorded sheet S fed into the sheet transfer area Q3 again, the toner image is transferred onto the second face.

The paper conveying device SH is constituted of the components with reference signs SH1 to SH3, Rp, Rs, Rr, Ra, Rb and MG.

(Explanation of Control Part of First Embodiment)

Figure 3:
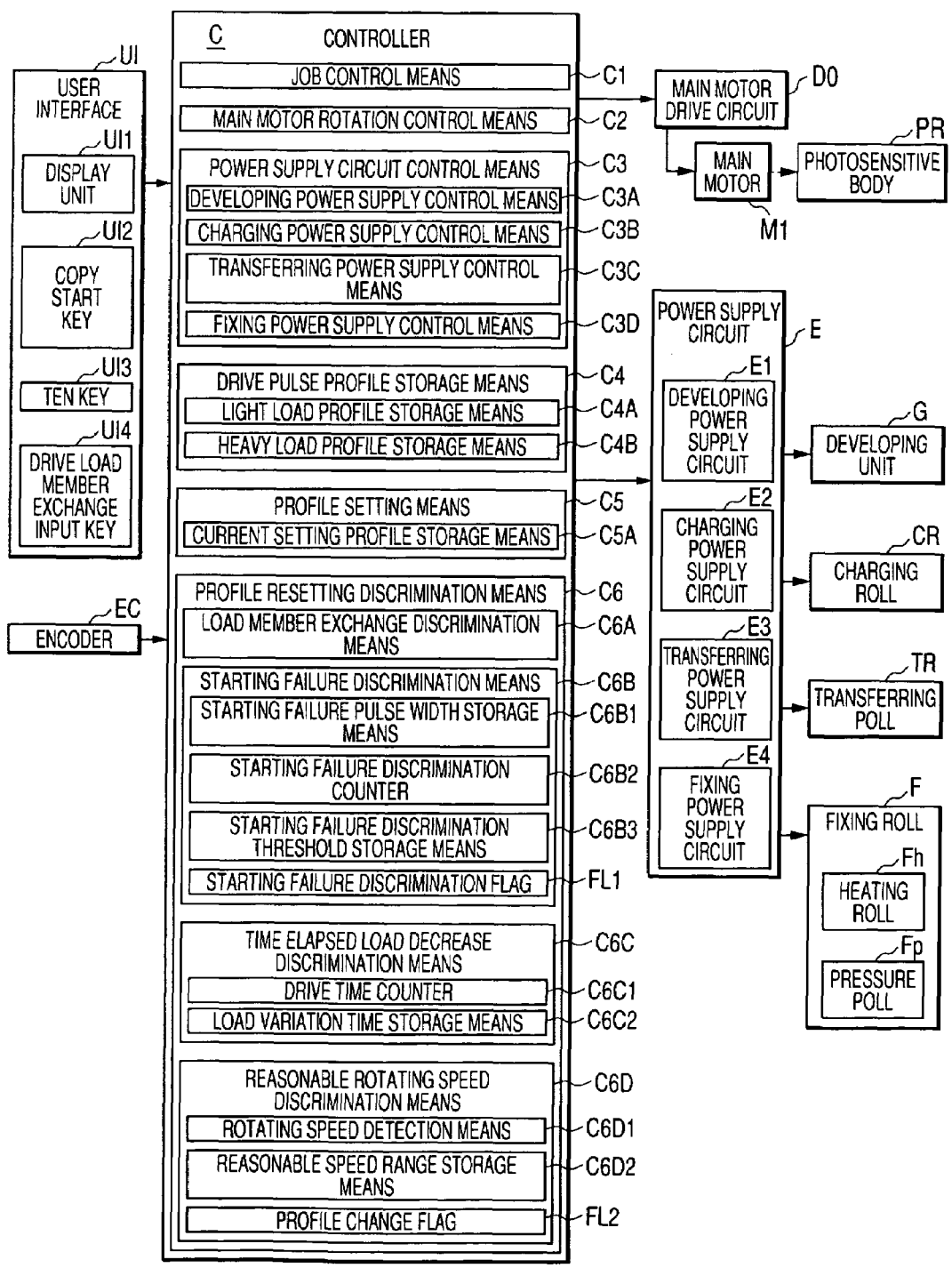
FIG. 3 is a block diagram (functional block diagram) of the functions of a control part in the image forming apparatus according to the first embodiment.

FIG. 3 is a block diagram (functional block diagram) of the functions of a control part in the image forming apparatus according to the first embodiment.

In FIG. 3, the controller C comprises an I/O (input/output interface) for inputting or outputting the signal from or to the outside and adjusting the input/output signal level, a ROM (Read Only Memory) or a hard disk storing the program and data used to perform required processing, a RAM (random access memory) for temporarily storing the required data, a CPU (Central Processing Unit) for performing the processing according to the program stored in the ROM, and a microcomputer having a clock oscillator, whereby various functions can be implemented by executing the program stored in the ROM.

(Signal Input Elements Connected to Controller C)

The controller C inputs the signal from the signal input elements such as UI (user interface) and encoder Ec.

The UI comprises the input keys such as a display unit UI1, a copy start key UI2, a ten key UI3, and a drive load member exchange input key UI4 inputted by the service engineer when the drive load member (cleaning blade CB) is exchanged. The UI detects that any key is inputted, and inputs its detection signal into the controller C.

The encoder Ec detects a rotation of the rotation shaft PRa of the photosensitive body PR.

(Controlled Element Connected to Controller C)

The controller C is connected to a main motor drive circuit DO, a power supply circuit E and other control elements, and outputs an operation control signal.

The power supply circuit E has a developing power supply circuit E1, a charging power supply circuit E2, a transferring power supply circuit E3 and a fixing power supply circuit E4.

The developing power supply circuit E1 applies a developing bias to a development roll R0 of the developing unit G.

The charging power supply circuit E2 applies a charging bias to the charging roll CR.

The transferring power supply circuit E3 applies a transferring bias to the transferring roll Rt.

The fixing power supply circuit E4 supplies a heating current to the heater of the heating roll Fh for the fixing unit F.

The main motor drive circuit D0 drives and rotates the photosensitive body (image bearing body) PR via a main motor M1. The main motor M1 of the first embodiment is a stepping motor driven and rotated in accordance with the input of pulse.

(Function of Controller C)

The controller C has a function (control portion) of outputting a control signal to each control element by performing a process according to an output signal from each signal output element. The function (control portion) of the controller C will be described below.

C1: Job Control Portion (Image Recording Control Portion)

Job control portion C1 controls the operation of the ROS, the image bearing body PR, the transfer roll Rt and the fixing unit F in accordance with an input of the copy start key UI2, to perform a job (print operation, copy operation) of image recording operation.

C2: Main Motor Rotation Control Portion

Main motor rotation control portion C2 controls the main motor drive circuit DO to drive the photosensitive body PR.

C3: Power Supply Circuit Control Portion

Power supply circuit control portion C3 has developing power control portion C3A, charging power control portion C3B, transferring power control portion C3C, and fixing power control portion C3D, and controls the power supply circuit E to supply electric power to each member of the image forming apparatus U.

C3A: Developing Power Control Portion

Developing power control portion C3A controls the developing power supply circuit E1 to adjust the developing bias.

C3B: Charging Power Control Portion

Charging power control portion C3B controls the charging power supply circuit E2 to adjust the charging bias.

C3C: Transferring Power Control Portion (Transfer Voltage Control Portion)

Transferring power control portion C3C controls the transferring power supply circuit E3 to adjust the transfer bias (transfer voltage)

C3D: Fixing Power Control Portion

Fixing power control portion C3D controls the fixing power supply circuit E4 to adjust the fixing temperature of the fixing unit F.

Figure 4:
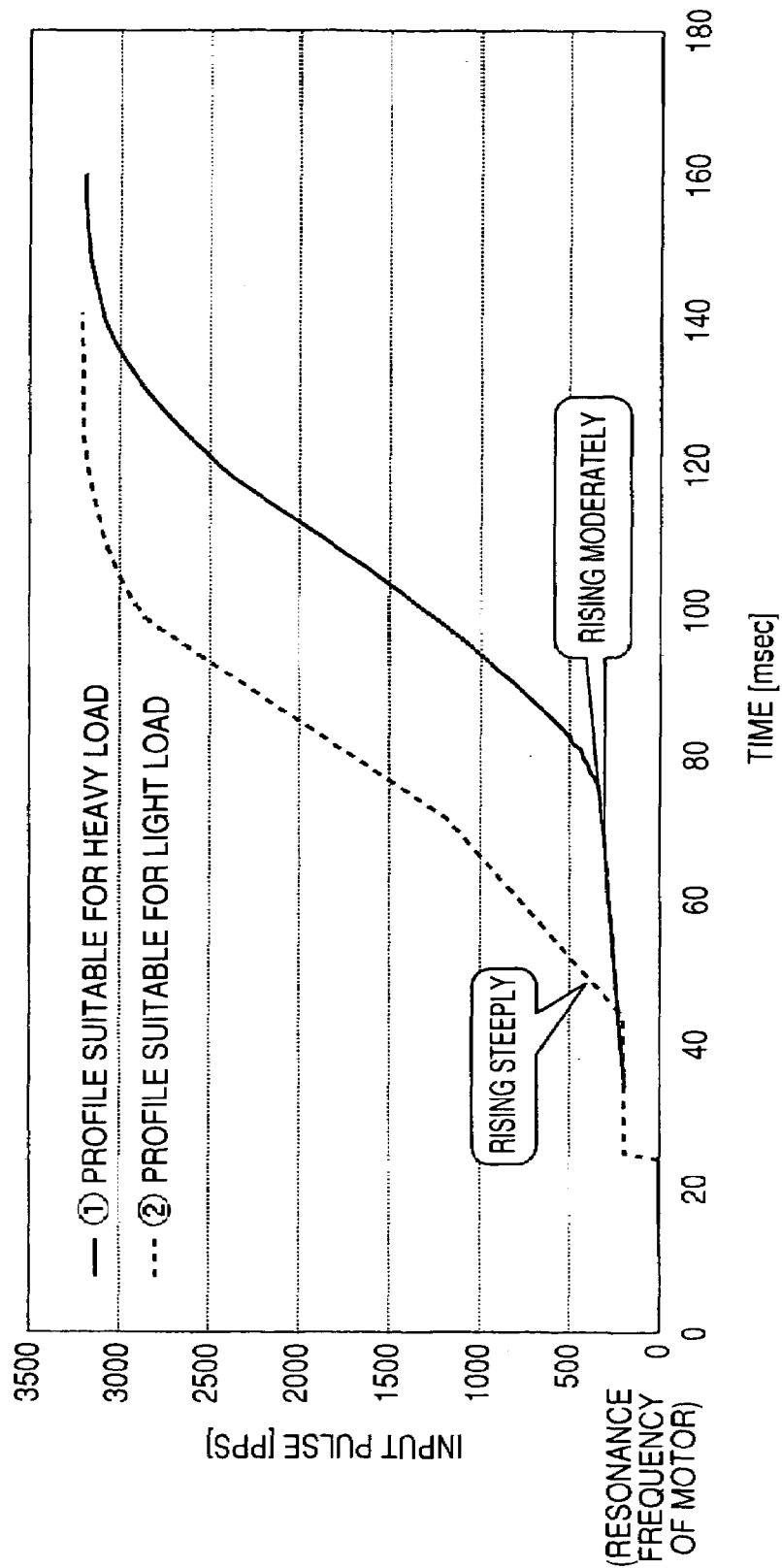
FIG. 4 is an explanatory view of a drive pulse profile according to the first embodiment.

FIG. 4 is an explanatory view of the drive pulse profile according to the first embodiment.

C4: Drive Pulse Profile Storage Portion

Drive pulse profile storage portion C4 has light load profile storage portion C4A and heavy load profile storage portion C4B, and stores drive pulse profiles that are temporal changes of the drive pulse for driving the motor that is inputted in starting the stepping motor M1.

C4A: Light Load Profile Storage Portion

Light load profile storage portion C4A stores a light load profile that is the drive pulse profile inputted into the stepping motor M1 when the load for driving the photosensitive body PR is light. In FIG. 4, the light load profile storage portion C4A of the first embodiment stores, as the light load profile, the profile optimized corresponding to the light load, in which the number of input pulses suddenly increases (steep slope) after start-up and a portion corresponding to the resonance frequency of the stepping motor M1 is rapidly passed (see the broken line of FIG. 4).

C4B: Heavy Load Profile Storage Portion

Heavy load profile storage portion C4B stores a heavy load profile that is the drive pulse profile inputted into the stepping motor M1 when the load for driving the photosensitive body PR is heavy. In FIG. 4, the heavy load profile storage portion C4B of the first embodiment stores, as the heavy load profile, the profile optimized corresponding to the heavy load, in which the number of input pulses gradually increases (gentle slope) after start-up and no step-out occurs however heavy the load is due to the member condition or the environment (see the solid line of FIG. 4).

C5: Profile Setting Portion

Profile setting portion C5 has current setting profile storage portion C5A and sets the drive pulse profile of the pulse inputted into the stepping motor M1 from among the drive pulse profiles stored in the drive pulse profile storage portion C4 in accordance with the load for driving the photosensitive body PR.

C5A: Current Setting Profile Storage Portion

Current setting profile storage portion C5A stores the drive pulse profile set by the profile setting portion C5 and used for driving the stepping motor M1 at present.

When the image forming apparatus U is shipped, the heavy profile is stored.

C6: Profile Resetting Discrimination Portion

Profile resetting discrimination portion C6 has load member exchange discrimination portion C6A, starting failure discrimination portion C6B, time elapsed load decrease discrimination portion C6C, and reasonable rotating speed discrimination portion C6D, and discriminates whether or not the drive pulse profile is set.

C6A: Load Member Exchange Discrimination Portion

Load member exchange discrimination portion C6A discriminates whether or not the cleaning blade CB of the photosensitive body cleaner CLp that becomes a load (resistance) on the rotation of the photosensitive body PR is exchanged. The load member exchange discrimination portion C6A of the first embodiment discriminates whether or not the member that becomes the load on the rotation is exchanged for the new member, and the load is increased.

C6B: Starting Failure Discrimination Portion

Starting failure discrimination portion C6B has starting failure pulse width storage portion C6B1, a starting failure discrimination counter C6B2, a starting failure discrimination threshold storage portion C6B3, and a starting failure discrimination flag FL1, and discriminates whether or not the stepping motor M1 steps out and the starting of the stepping motor fails, based on the detection result of the encoder Ec. The starting failure discrimination portion C6B of the first embodiment discriminates that the step-out occurs, and the starting of the stepping motor M1 fails, if the number of times that the pulse width of output pulse outputted from the encoder Ec is larger than the starting failure pulse width which is greater than or equal to the starting failure discrimination threshold.

C6B1: Starting Failure Pulse Width Storage Portion

Starting failure pulse width storage portion C6B1 stores the starting failure pulse width that is the maximum pulse width outputted from the encoder Ec, when the stepping motor M1 is normally started. That is, if the pulse width of the output pulse outputted from the encoder Ec exceeds the starting failure pulse width, it is discriminated that the time for which one slit Ec1a passes the position of detection light is longer than normally, namely, the rotating speed of the photosensitive body PR is slower than normally.

C6B2: Starting Failure Discrimination Counter C6B2

Starting failure discrimination counter C6B2 counts the starting failure discrimination count value n that is the number of times that the pulse width outputted from the encoder Ec is greater than or equal to the starting failure pulse width.

C6B3: Starting Failure Discrimination Threshold Storage Portion

Starting failure discrimination threshold storage portion C6B3 stores the starting failure discrimination threshold n1 for discriminating whether or not the starting of the stepping motor M1 fails, based on the starting failure discrimination count value n.

FL1: Starting Failure Discrimination Flag

Starting failure discrimination flag FL1 has an initial value of "0", and becomes "1" if the starting of the stepping motor M1 fails, or "0" if the restarting of the stepping motor M1 is ready.

C6C: Time Elapsed Load Decrease Discrimination Portion

Time elapsed load decrease discrimination portion C6C has a drive time counter C6C1 and load variation time storage portion C6C2, and discriminates whether or not the rotational load of the photosensitive body PR decreases over the course of time because the cleaning blade CB of the rotational load member wears or deteriorates with the passage of time. The time elapsed load decrease discrimination portion C6C of the first embodiment discriminates that the rotational load decreases over the course of time if the accumulated drive time t for which the photosensitive body PR is driven and rotated is greater than or equal to a preset load variation time t1.

C6C1: Drive Time Counter

Drive time counter C6C1 counts the accumulated time t for which the photosensitive body PR is driven and rotated.

C6C2: Load Variation Time Storage Portion

Load variation time storage portion C6C2 stores the load variation time t1 for discriminating whether or not the rotational load of the photosensitive body PR decreases over the course of time. The load variation time t1 is acquired beforehand by experiments.

Figure 5A:
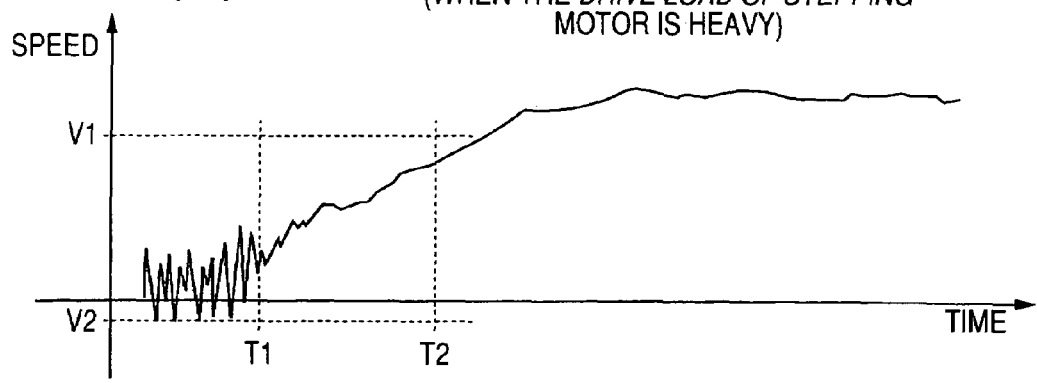
FIG. 5A is an explanatory view in which the drive load is heavy.
Figure 5B:
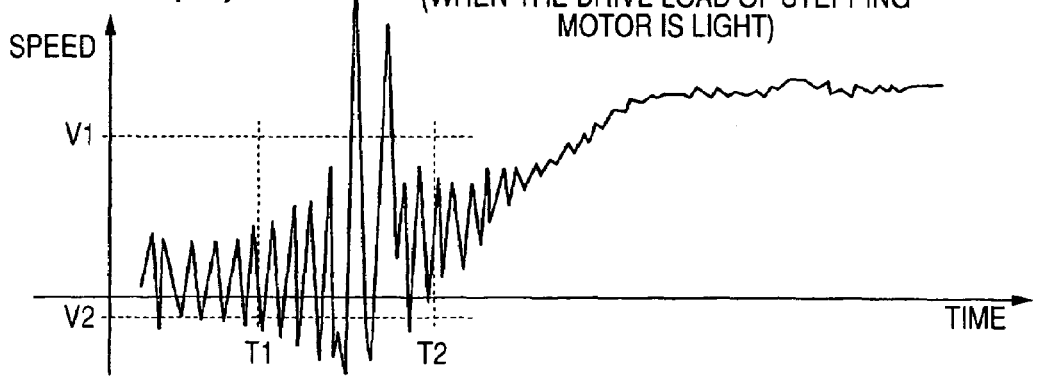
FIG. 5B is an explanatory view in which the drive load is light and no step-out occurs at the time of start-up.
Figure 5C:
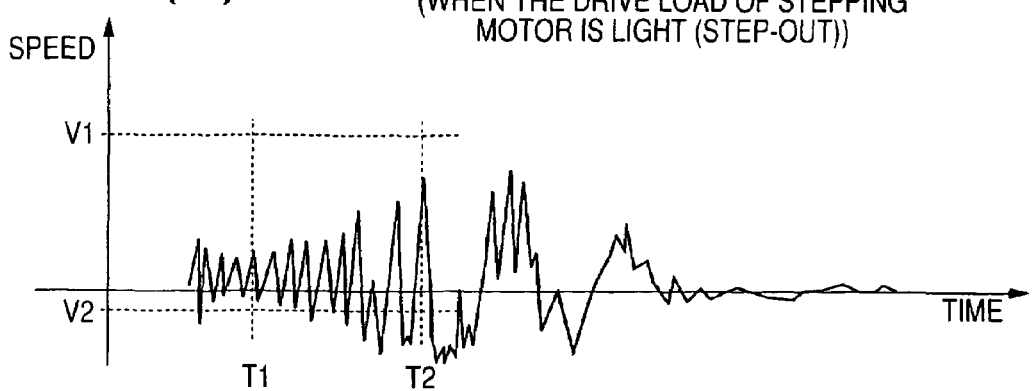
FIG. 5C is an explanatory view in which the drive load is light and a step-out occurs.

FIG. 5 is an explanatory view showing an example of speed change at the time of start-up, using the heavy load profile as the drive pulse profile for driving the motor in the stepping motor according to the first embodiment. FIG. 5A is an explanatory view when the drive load is heavy, FIG. 5B is an explanatory view when the drive load is light and the stepping motor is started without step-out, and FIG. 5C is an explanatory view when the drive load is light and the step-out occurs.

C6D: Reasonable Rotating Speed Discrimination Portion

Reasonable rotating speed discrimination portion C6D has rotating speed detection portion C6D1, reasonable speed range storage portion C6D2, and a profile change flag FL2, and discriminates whether or not the rotating speed of the photosensitive body PR is within a reasonable range. The reasonable rotating speed discrimination portion C6D of the first embodiment judges that when the rotating speed is out of a reasonable range in the period (T1 to T2) for which the stepping motor M1 is rotated at the number of rotations (rotation frequency) close to the resonance frequency of the stepping motor M1 at the time of start-up so that the stepping motor steps out, or when the rotating speed is out of the reasonable range even though the starting is successful without step-out, the drive pulse profile currently used is not the optimal drive pulse profile (i.e., too light or too heavy load) for the rotation load of the photosensitive body PR.

C6D1: Rotating Speed Detection Portion

Rotating speed detection portion C6D1 detects the rotating speed of the photosensitive body PR, based on the detection result of the encoder Ec. That is, the rotating speed of the photosensitive body PR is calculated and detected, based the output pulse width (time) of the encoder Ec and the peripheral width (length) of the slit Ec1a and the peripheral width (length) of the light shielding part between the slits Ec1a.

C6D2: Reasonable Speed Range Storage Portion

Reasonable speed range storage portion C6D2 stores the reasonable range of speed normally detected in the period (from discrimination period start time T1 to discrimination period end time T2) for which the stepping motor M1 is rotated at the number of rotations (rotation frequency) close to the resonance frequency of the stepping motor M1, which is already known by experiments, in starting the stepping motor M1. The reasonable speed range storage portion C6D2 of the first embodiment stores a speed upper limit threshold V1 and a speed lower limit threshold V2 (see FIG. 5) as the reasonable range of speed in the period T1 to T2 for which the drive pulse is inputted at the rotation frequency close to the known resonance frequency of the stepping motor M1.

The profile change flag FL2 has an initial value of "0", and becomes "1" if it is discriminated that the rotating speed of the photosensitive body PR is not within the reasonable range, or "0" if the drive pulse profile is changed.

(Explanation of Flowchart of the First Embodiment)

(Explanation of Flowchart for Motor Drive Pulse Profile Setting Process)

Figure 6:
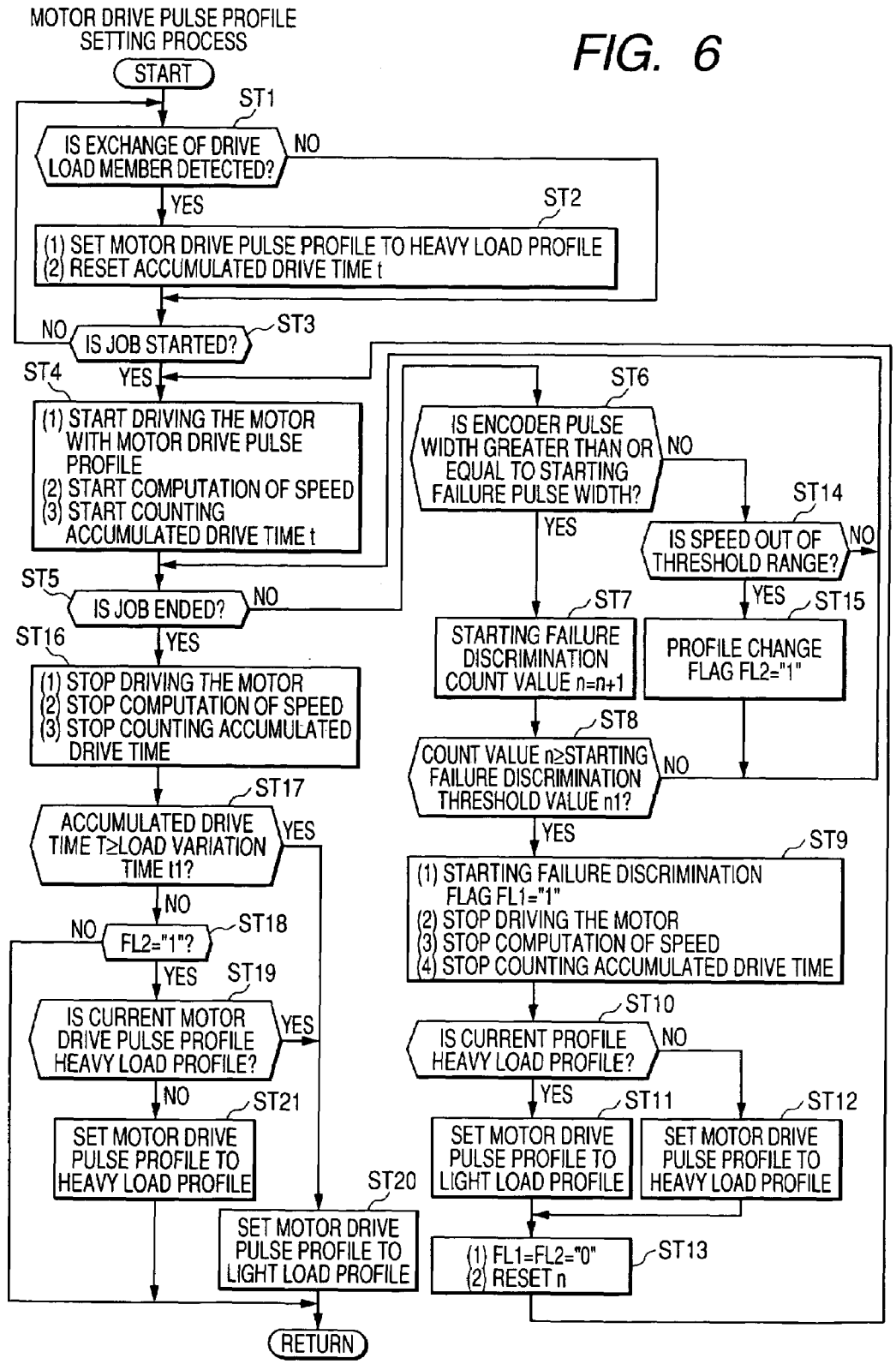
FIG. 6 is a flowchart of a motor drive pulse profile setting process according to the first embodiment.

FIG. 6 is a flowchart of a motor drive pulse profile setting process according to the first embodiment.

The processing at each ST (step) in the flowchart of FIG. 6 is performed in accordance with the program stored in the ROM or hard disk of the controller C. Also, this process is performed in multi-task in parallel with various other processes of the printer U. The flowchart of FIG. 6 is started when the power of the printer U is turned on.

At ST1 of FIG. 6, a determination is made whether or not an exchange of the drive load member is detected, namely, the drive load member exchange input key UI4 is inputted. If the answer is yes (Y), the procedure goes to ST2, or if the answer is no (N), the procedure goes to ST3.

The following processings (1) and (2) are performed at ST2, and the procedure goes to ST3.

(1) The drive pulse profile for driving the motor is set to the heavy load profile.

(2) The accumulated drive time t is reset (initialized to 0).

At ST3, a determination is made whether or not a job of image forming operation is started. If the answer is yes (Y), the procedure goes to ST4, or if the answer is no (N), the procedure returns to ST1.

The following processings (1) to (3) are performed at ST4, and the procedure goes to ST5.

(1) The driving of the stepping motor M1 is started with the currently set drive pulse profile for driving the motor.

(2) The detection of the speed of the photosensitive body PR is started.

(3) The counting of the accumulated drive time t is started.

At ST5, a determination is made whether or not the job is ended. If the answer is no (N), the procedure goes to ST6, or if the answer is yes (Y), the procedure goes to step ST16.

At ST6, a determination is made whether or not the pulse width of output pulse of the encoder Ec is greater than or equal to the starting failure pulse width. If the answer is yes (Y), the procedure goes to ST7, or if the answer is no (N), the procedure goes to ST14.

At ST7, the starting failure discrimination count value is incremented, n=n+1. That is, 1 is added to the starting failure discrimination count value n. And the procedure goes to ST8.

At ST8, a determination is made whether or not the starting failure discrimination count value n is greater than or equal to the starting failure discrimination threshold n1. If the answer is yes (Y) (i.e., step-out occurs), the procedure goes to ST9, or if the answer is no (N), the procedure goes to ST5.

The following processings (1) to (4) are performed at ST9, and the procedure goes to ST10.

(1) The starting failure discrimination flag FL1 is set to "1". That is, the other processes of the image forming apparatus U are temporarily stopped till the stepping motor M1 is restarted.

(2) The driving of the stepping motor M1 is stopped.

(3) The speed calculation is stopped.

(4) The counting of the accumulated drive time t is stopped.

At ST10, a determination is made whether or not the current drive pulse profile is the heavy load profile. If the answer is yes (Y), the procedure goes to ST11, or if the answer is no (N), the procedure goes to ST12.

At ST11, the drive pulse profile for driving the motor is set to the light load profile. And the procedure goes to ST13.

At ST12, the drive pulse profile for driving the motor is set to the heavy load profile. And the procedure goes to ST13.

The following processings (1) and (2) are performed at ST13, and the procedure returns to ST4 to restart the stepping motor M1.

(1) The starting failure discrimination flag FL1 and the profile change flag FL2 are set to "0".

(2) The starting failure discrimination count value n is reset (initialized to 0).

At ST14, a determination is made whether or not the photosensitive body PR in the period T1 to T2 for which the pulse at the frequency close to the known resonance frequency of the motor is inputted is out of the range of speed threshold, that is, whether or not the rotating speed is between the speed upper limit threshold V1 and the speed lower limit threshold V2. If the answer is yes (Y), the procedure goes to ST15, or if the answer is no (N), the procedure returns to ST5.

At ST15, the profile change flag FL2 is set to "1". And the procedure returns to ST5.

The following processings (1) to (3) are performed at ST16, and the procedure goes to ST17.

(1) The driving of the stepping motor M1 is stopped.

(2) The computation of the rotating speed of the photosensitive body PR is stopped.

(3) The counting of the accumulated drive time t is stopped.

At ST17, a determination is made whether or not the accumulated drive time t is greater than or equal to the load variation time t1. If the answer is no (N), the procedure goes to ST18, or if the answer is yes (Y), the procedure goes to ST20.

At ST18, a determination is made whether or not the profile change flag FL2 is "1", that is, the rotating speed becomes out of the reasonable range while starting the stepping motor M1, but the start-up is successful and the job is ended. If the answer is yes (Y), the procedure goes to ST19, or if the answer is no (N), the procedure returns to ST1.

At ST19, a determination is made whether or not the current drive pulse profile for driving the motor is the light load profile. If the answer is yes (Y), the procedure goes to ST20, or if the answer is no (N), the procedure goes to ST21.

At ST20, the drive pulse profile for driving the motor is set to the light load profile. And the procedure returns to ST1.

At ST21, the drive pulse profile for driving the motor is set to the heavy load profile. And the procedure returns to ST1.

(Operation of First Embodiment)

In the image forming apparatus U of the first embodiment having the above constitution, the stepping motor M1 for driving the photosensitive body PR is driven and rotated by the input of pulses in accordance with the prestored drive pulse profile, when the photosensitive body PR is driven. And the drive pulse profile is set to the appropriate pulse file in accordance with the rotation load of the photosensitive body PR.

That is, when the cleaning blade CB as the drive load member is exchanged for the new member, the rotation load of the photosensitive body PR is larger than where the deteriorated cleaning blade CB is mounted, whereby the drive pulse profile is set to the heavy load profile (see ST1 and ST2 in FIG. 6). And if the time elapsed (accumulated drive time t) since the drive load member is exchanged for the new member exceeds a predetermined time (load variation time t1), the drive pulse profile is set to the light load profile, judging that the cleaning blade CB wears or deteriorates over the course of time, and the rotation load is decreased (see ST17 and ST20 in FIG. 6).

Also, in the image forming apparatus U of the first embodiment, whether or not the step-out occurs is discriminated, based on the detection result of the encoder Ec (see ST6 to ST8 in FIG. 6). And if the drive pulse profile is the heavy load profile when the step-out occurs, the drive pulse profile is set to the light load profile (see ST10 and ST11 in FIG. 6), judging that the resonance occurs at the resonance frequency (about 500 pps (pulse per second) in this first embodiment) of the stepping motor M1 due to too light load, and the step-out occurs, as shown in FIG. 5C. Since a portion of the resonance frequency is passed rapidly by setting the light load profile, the resonance or the step-out due to resonance is less likely to occur, whereby the stepping motor can be started with the drive pulse profile optimized for the light load.

On the other hand, if the drive motor pulse profile is the light load profile when the step-out occurs, the drive pulse profile is set to the heavy load profile (see ST10 and ST12 in FIG. 6), judging that the torque lacks due to too heavy load, and the step-out occurs. The stepping motor M1 can be started without step-out with the drive pulse profile optimized for the heavy load by setting the heavy load profile.

Also, in the image forming apparatus U of the first embodiment, the stepping motor M1 is started without step-out, but if the rotating speed is out of the reasonable range of speed during the starting (see FIG. 5B), the drive pulse profile is reset to the one different from the currently used drive pulse profile, judging that the current drive pulse profile is not optimal for the load (see ST15, ST19 to ST21 in FIG. 6).

Accordingly, in the image forming apparatus U of the first embodiment, when the stepping motor M1 is driven, the drive pulse profile is set to the one corresponding to the load of the photosensitive body PR from among plural drive pulse profiles optimized beforehand for each state of the load. Accordingly, the stepping motor M1 can be started under the simple control, as compared with the prior art where the actual rotation position of the rotor (photosensitive body PR) and the theoretical rotation position are always monitored, and the drive pulse is controlled at any time in accordance with a difference between them. As a result, in the image forming apparatus U of the first embodiment, the computational load is reduced, as compared with the prior art. Particularly, in the image forming apparatus U of the first embodiment, a determination is made based on the rotating speed in the preset period (T1 to T2), whereby the computational load is greatly reduced as compared with the case where the monitoring is always made.

Also, even when the step-out occurs, the drive pulse profile is reset from the prepared drive pulse profiles according to a cause of step-out, whereby the step-out can be prevented from the next time. As a result, the step-out is reduced. Also, even though the step-out does not occur, if the possibility that the step-out occurs over the course of time is increased (see ST17 and ST20 in FIG. 6), or if a symptom of step-out is detected at the previous time of starting (see ST15), the drive pulse profile is set to the appropriate drive pulse profile. Consequently, the step-out is suppressed.

Further, in the image forming apparatus U of the first embodiment, even though the step-out occurs, the stepping motor is automatically restarted without error termination (see ST9 to ST13), whereby the user does not need to make an input for error recovery, and the convenience of the user is enhanced. Though in the first embodiment the stepping motor is automatically restarted, the stepping motor is not automatically restarted but may be manually restarted in accordance with an input of the user.

Second Embodiment

Figure 7:
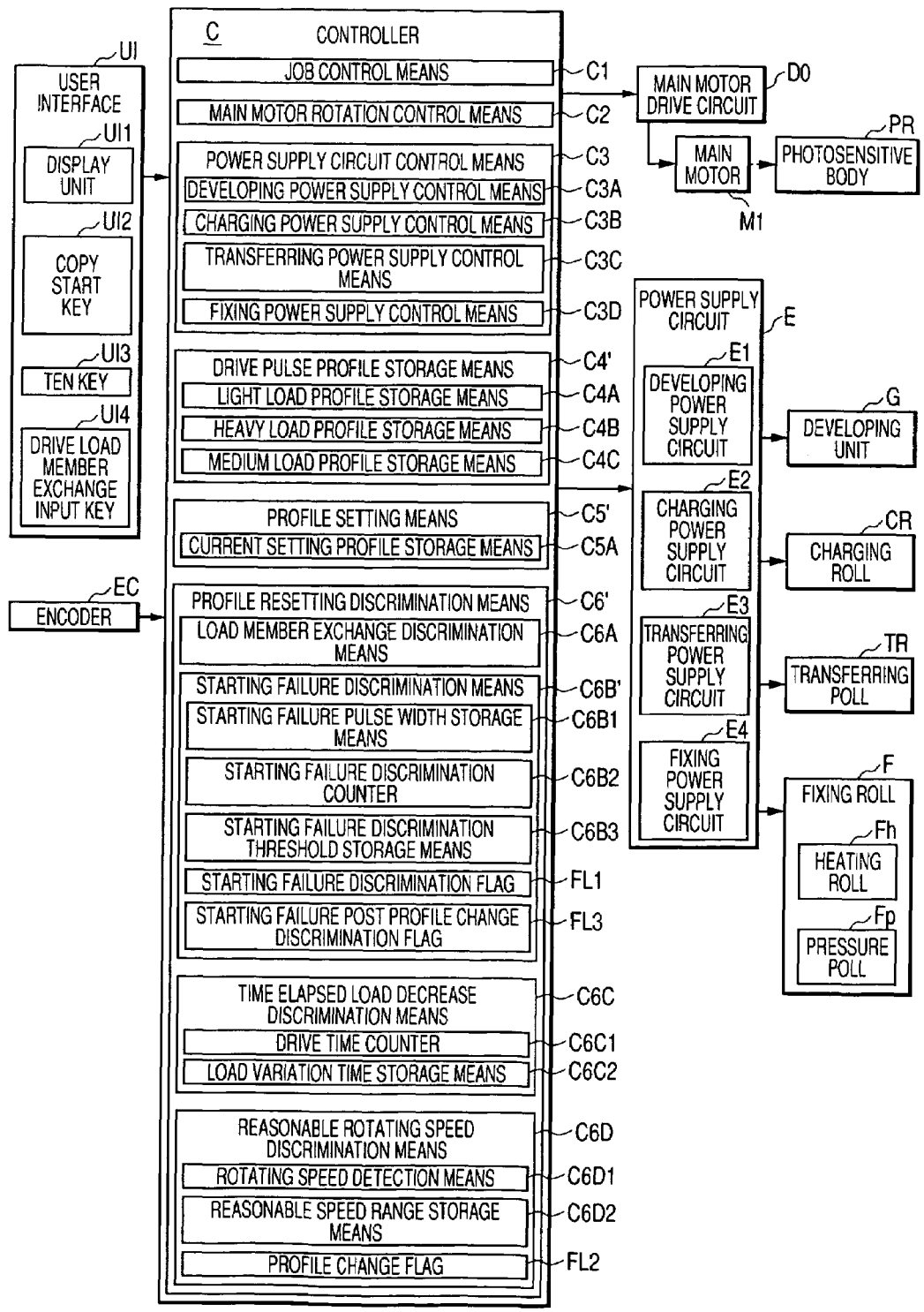
FIG. 7 is a block diagram (functional block diagram) of the functions of a control part in an image forming apparatus according to a second embodiment of the invention.

FIG. 7 is a block diagram (functional block diagram) of the functions of a control part in an image forming apparatus according to a second embodiment of the invention, corresponding to FIG. 3 in the first embodiment.

In the explanation of the second embodiment, the parts corresponding to the parts of the first embodiment are denoted by the same reference numerals, and not described in detail here.

The second embodiment is different from the first embodiment in the following points, but the same in the other points as the first embodiment.

In FIG. 7, the controller C of the second embodiment has drive pulse profile storage portion C4', profile setting portion C5' and profile resetting discrimination portion C6', unlike the first embodiment.

Figure 8:
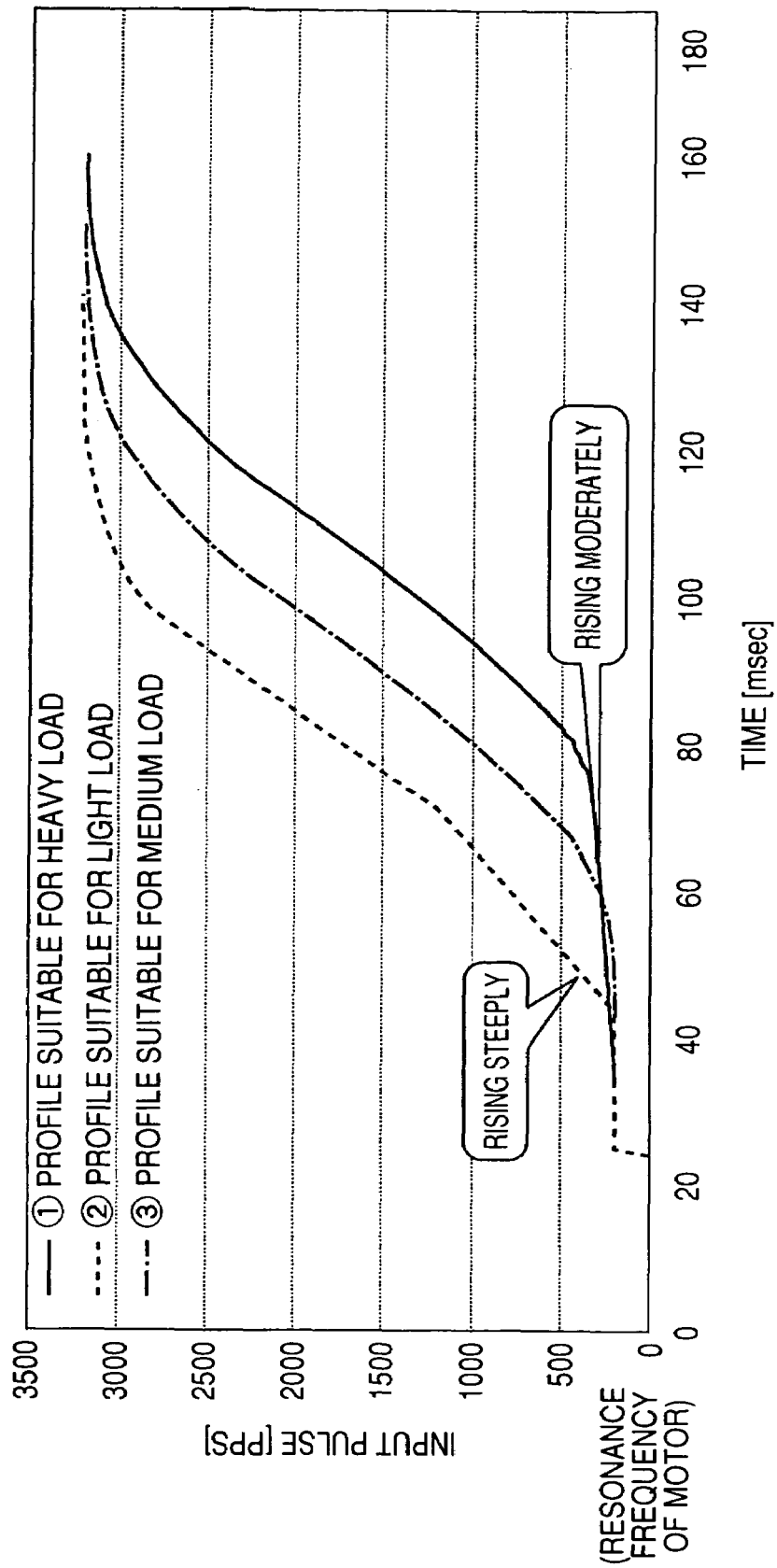
FIG. 8 is an explanatory view of a drive pulse profile according to the second embodiment, corresponding to FIG. 4 of the first embodiment.

FIG. 8 is an explanatory view of the drive pulse profile according to the second embodiment, corresponding to FIG. 4 of the first embodiment.

C4': Drive Pulse Profile Storage Portion

Drive pulse profile storage portion C4' has medium load profile storage portion C4C, in addition to the light load profile storage portion C4A and the heavy load profile storage portion C4B of the first embodiment.

C4C: Medium Load Profile Storage Portion

Medium load profile storage portion C4C stores a medium load profile that is the drive pulse profile inputted into the stepping motor M1 when the load for driving the photosensitive body PR is medium. In FIG. 8, the medium load profile storage portion C4C of the second embodiment stores, as the medium load profile, the profile optimized corresponding to the medium load, in which the number of pulses is at a medium rate between the light load profile and the heavy load profile (see the dashed line in FIG. 8).

C5': Profile Setting Portion

Profile setting portion C5' of the second embodiment has the same current setting profile storage portion C5A as that of the first embodiment to set the drive pulse profile of the pulse inputted into the stepping motor M1 from among the drive pulse profiles (light load profile, heavy load profile, medium load profile) stored in the drive pulse profile storage portion C4 in accordance with the load for driving the photosensitive body PR.

C6': Profile Resetting Discrimination Portion

Profile resetting discrimination portion C6' of the second embodiment has the load member exchange discrimination portion C6A, the time elapsed load decrease discrimination portion C6C, and the reasonable rotating speed discrimination portion C6D, like the first embodiment, and starting failure discrimination portion C6B', unlike the first embodiment.

C6B': Starting Failure Discrimination Portion

Starting failure discrimination portion C6B' of the second embodiment has the starting failure pulse width storage portion C6B1, the starting failure discrimination counter C6B2, the starting failure discrimination threshold storage portion C6B3, and the starting failure discrimination flag FL1, like the first embodiment, and additionally a starting failure post profile change discrimination flag FL3.

FL3: Starting Failure Post Profile Change Discrimination Flag

A starting failure post profile change discrimination flag FL3 has an initial value of "0", and becomes "1" if the drive pulse profile is set to the heavy load profile because the step-out occurs when the drive pulse profile is medium load profile, or "0" if the drive pulse profile is set to the light load profile.

(Explanation of Flowchart of the Second Embodiment)

(Explanation of Flowchart of Motor Drive Pulse Profile Setting Process)

Figure 9:
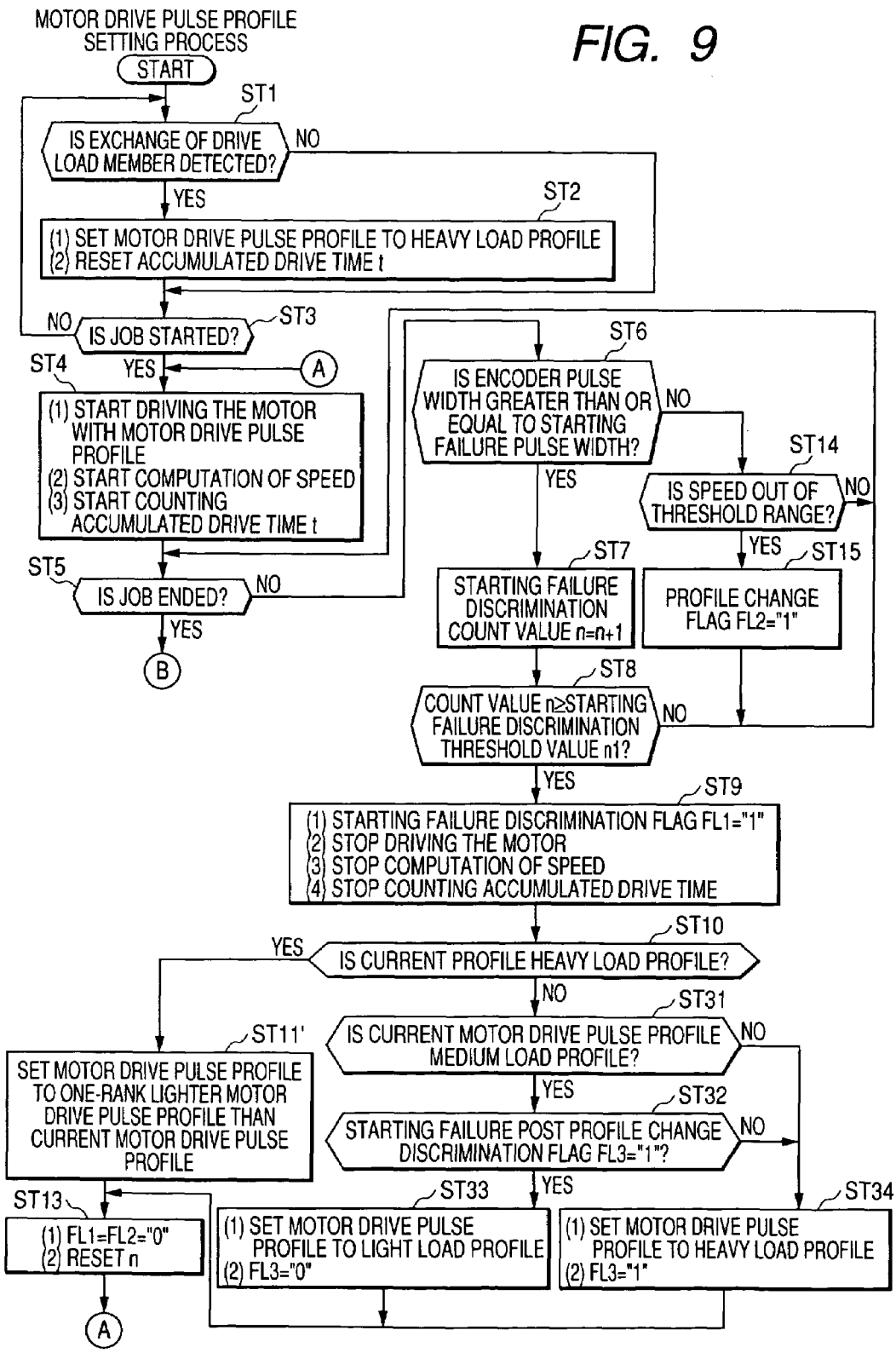
FIG. 9 is a flowchart of a motor drive pulse profile setting process according to the second embodiment, corresponding to FIG. 6 of the first embodiment.

FIG. 9 is a flowchart of a motor drive pulse profile setting process according to the second embodiment, corresponding to FIG. 6 of the first embodiment.

Figure 10:
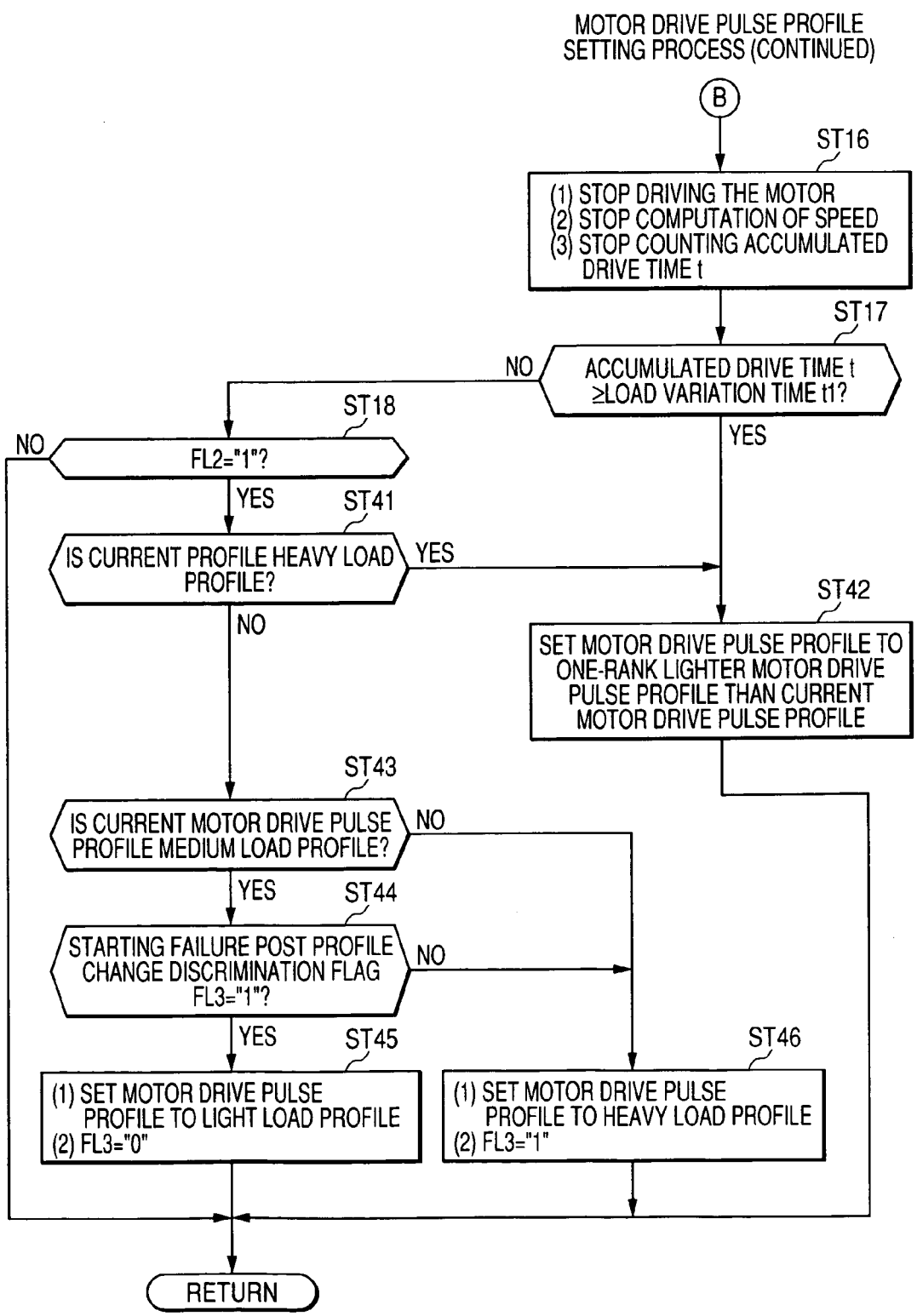
FIG. 10 is a flowchart of the motor drive pulse profile setting process according to the second embodiment, continued from FIG. 9.

FIG. 10 is a flowchart of the motor drive pulse profile setting process of the second embodiment, continued from FIG. 9.

The flowcharts of the second embodiment will be described below, but the same steps are denoted by the same ST numbers as in the explanation of the flowchart of the first embodiment, and not described in detail.

In FIG. 9, the steps ST1 to ST9 are performed and the procedure goes to ST10.

At ST10 of FIG. 9, a determination is made whether or not the current drive pulse profile is the heavy load profile. If the answer is yes (Y), the procedure goes to ST11', or if the answer is no (N), the procedure goes to ST31.

At ST11', instead of ST11 in the first embodiment, the drive pulse profile for driving the motor is set to the one-level lighter drive pulse profile lighter than the current drive pulse profile. Accordingly, if the current drive pulse profile is the heavy load profile, the drive pulse profile is reset to the medium load profile, or if the current drive pulse profile is the medium load profile, the drive pulse profile is set to the light load profile. And the procedure goes to ST13.

At ST31, a determination is made whether or not the current drive pulse profile is the medium load profile. If the answer is yes (Y), the procedure goes to ST32, or if the answer is no (N), the procedure goes to ST34.

At ST32, a determination is made whether or not the starting failure post profile change discrimination flag FL3 is "1". If the answer is yes (Y), the procedure goes to ST33, or if the answer is no (N), the procedure goes to ST34.

The following processings (1) and (2) are performed at ST33, and the procedure goes to ST13.

(1) The drive pulse profile for driving the motor is set to the light load profile.

(2) The starting failure post profile change discrimination flag FL3 is set to "0".

The following processings (1) and (2) are performed at ST34, and the procedure goes to ST13.

(1) The drive pulse profile for driving the motor is set to the heavy load profile.

(2) The starting failure post profile change discrimination flag FL3 is set to "1".

In FIGS. 9 and 10, in the motor drive pulse profile setting process of the second embodiment, the steps ST13 to ST18 are performed as in the first embodiment, and the steps ST41 to ST46 are performed, instead of the steps ST19 to ST21 in the first embodiment. The steps ST41 to ST46 are the same as the steps ST10, ST11' and ST31 to ST34, and not described in detail.

That is, at ST17, if the answer is yes (Y), the procedure goes to ST42 (same processing as ST11'), or if the answer is no (N), the procedure goes to ST18.

At ST18, if the answer is yes (Y), the procedure goes to ST41 (same processing as ST10), or if the answer is no (N), the procedure returns to ST1.

And the steps ST41 to ST46 are performed, and finally the procedure returns to ST1.

(Operation of Second Embodiment)

In the image forming apparatus U of the second embodiment having the above constitution, the drive pulse profile of the stepping motor M1 is set to any one of light load, heavy load and medium load profiles in accordance with the rotation load of the photosensitive body PR. Accordingly, the more precise control can be made than in the first embodiment. Also, in the image forming apparatus U of the second embodiment, if the medium load profile is employed when a step-out occurs or a symptom of step-out is detected, the drive pulse profile is firstly changed to the heavy load profile (see ST32 and ST34), because it is unknown whether the load is too heavy or too light, and further if there is still a step-out or a symptom of step-out, the drive pulse profile is changed to the light load profile (see ST11', ST32 and ST33). Accordingly, in the image forming apparatus U of the second embodiment, the appropriate drive pulse profile is finally set in accordance with the load.

Accordingly, in the image forming apparatus U of the second embodiment, the appropriate drive pulse profile is set in accordance with the load of the photosensitive body PR, whereby the step-out is prevented, as in the first embodiment. Consequently, the computational load is reduced as compared with the prior art. Besides, the image forming apparatus U of the second embodiment has the same effects as that of the first embodiment.

(Another Embodiments)

Though the embodiments of the present invention have been described above, the invention is not limited to the above embodiments, but various changes may be made thereto without departing from the scope or spirit of the invention as defined in the claims. The variant embodiments (H01) to (H07) of the invention are exemplified below.

(H01) The image forming apparatus of the invention is not limited to the copying machine, but maybe applicable to the printer, FAX or the composite machine having two or more of their functions. Also, the image forming apparatus is not limited to the monochrome image forming apparatus, but may be applicable to the full color image forming apparatus. Also, the image forming apparatus is not limited to the electrophotographic image forming apparatus, but may be applicable to the image forming apparatus of any image recording method such as an ink jet recording method.

(H02) Though in the above embodiments the photosensitive body is exemplified as the rotation member, the rotation member may be the rotor driven and rotated by the stepping motor, such as the pickup roll Rp, the sheet conveying roll Ra, the registration roll Rr, the development roll R0, the transfer belt driving roll Rd, or the heating roll Fh for the fixing unit. Accordingly, the rotation member is not limited to the drum-like rotor, but may be applicable to the rotor of any roll or belt shape.

(H03) Though in the above embodiments two or three kinds of drive pulse profiles are exemplified, four or more kinds of profiles may be employed.

(H04) Though in the above embodiments the cleaning blade CB is exemplified as the rotational load member, and the load is increased at the time of exchange, the rotational load member is not limited to the cleaning blade CB but the drive pulse profile may be reset when exchanging the member (transfer belt or charging roll) that serves as the resistive member by contacting the photosensitive body. Conversely, when the load after exchange is decreased by detecting an exchange of the member (e.g., bearing of photosensitive body) in which the load is increased due to a deterioration with the passage of time, the drive pulse profile may be reset to the one-level lighter profile.

(H05) Though in the above embodiments the control is made based on the drive time to detect a decrease in the load over the course of time, any parameter that can measure or estimate the elapsed time such as the number of rotations of the photosensitive body PR or the job execution time may be employed.

(H06) Though in the above embodiments the drive pulse profile is set based on exchange of the rotational load member, a decrease in the load with the passage of time, starting failure, or whether or not the rotating speed is within the reasonable range, it is unnecessary to make a discrimination in all the cases, any one or more cases maybe employed. Conversely, besides the above cases, the drive pulse profile may be changed, when the load is varied in any other way than exemplified in the embodiments, such as based on whether or not the load is increased over the course of time, for example.

(H07) Though in the above embodiments the rotation load of the rotor is indirectly detected by the encoder Ec, the load may be directly detected, employing a torque sensor for detecting the torque itself acting on the rotation shaft PRa.

As described above, according to an aspect of the present invention, the image forming apparatus comprises the stepping motor that drives the rotor by rotating in accordance with the input of drive pulse. The drive pulse profile storage portion stores the drive pulse profiles that are temporal changes of the drive pulse inputted in starting the stepping motor. The drive pulse profile storage portion stores at least the light load profile that is the drive pulse profile inputted when the load for driving the rotor is light and the heavy load profile that is the drive pulse profile inputted when the load for driving the rotor is heavy. The profile setting portion sets the drive pulse profile in accordance with the load for driving the rotor as the drive pulse profile of pulses inputted into the stepping motor from among the drive pulse profiles stored in the drive pulse profile storage portion.

Accordingly, in the image forming apparatus of the aspect of the invention described above, the appropriate drive pulse profile is set in accordance with the load for driving the rotor from among the drive pulse profiles stored in the drive pulse profile storage portion. Consequently, the step-out may be reduced. Since the motor is driven using the prestored drive pulse profile, it may be unnecessary to change the drive pulses at any time or make the complex control. Consequently, since it is unnecessary to perform a process for discriminating the timing of changing the drive pulse or a process for changing the drive pulse during the driving, the computational load may be reduced. Consequently, in the image forming apparatus of the first invention, the step-out may be reduced with a simple constitution.

According to another aspect of the invention, the image forming apparatus further includes a rotation detection sensor for detecting a rotation state of the rotor, starting failure discrimination portion for discriminating whether or not the stepping motor steps out and the starting of the stepping motor fails, based on the detection result of the rotation detection sensor and the profile setting portion for setting the drive pulse profile appropriate according to the load, when the starting of the stepping motor fails.

In the image forming apparatus according to the aspect of the invention described above, the rotation detection sensor detects a rotation state of the rotor. The starting failure discrimination portion discriminates whether or not the stepping motor steps out and the starting of the stepping motor fails, based on the detection result of the rotation detection sensor. The profile setting portion sets the drive pulse profile appropriate according to the load, when the starting of the stepping motor fails.

Accordingly, when the starting of the stepping motor fails due to step-out, the appropriate drive pulse profile may be set according to the load of the rotor, instead of the inappropriate drive pulse profile, whereby the step-out may be reduced.

According to another aspect of the invention, the image forming apparatus further includes the rotational load member for applying a load to prevent the rotor from being driven and rotated, load member exchange discrimination portion for discriminating whether or not the rotational load member is exchanged and the profile setting portion for setting the heavy load profile as the drive pulse profile when the rotational load member is exchanged.

In the image forming apparatus according to the aspect of the invention described above, the rotational load member applies a load to prevent the rotor from being driven and rotated. The load member exchange discrimination portion discriminates whether or not the rotational load member is exchanged. The profile setting portion sets the heavy load profile as the drive pulse profile by judging that the load for driving the rotor is increased when the rotational load member is exchanged.

Accordingly, when the rotational load member is exchanged and the load is varied, the appropriate drive pulse profile may be set according to the load, whereby the step-out may be reduced.

According to another aspect of the invention, the image forming apparatus further includes a drive time counter for counting the drive time of the rotor since the rotational load member is exchanged, load variation time storage portion for storing the load variation time that is the timing at which the drive pulse profile is changed because the load of the rotational load member is decreased over the course of time and the profile setting portion for setting the light load profile as the drive pulse profile if the accumulated drive time counted by the drive time counter is greater than the load variation time.

In the image forming apparatus according to the aspect of the invention described above, the drive time counter counts the drive time of the rotor since the rotational load member is exchanged. The load variation time storage portion stores the load variation time that is the timing at which the drive pulse profile is changed because the load of the rotational load member is decreased over the course of time. The profile setting portion sets the light load profile as the drive pulse profile if the accumulated drive time counted by the drive time counter is greater than the load variation time.

Accordingly, the appropriate drive pulse profile may be set according to the load of the rotational load member decreased over the course of time, whereby the step-out may be reduced.

According to another aspect of the invention, the image forming apparatus further includes a rotating speed detection portion for detecting the rotating speed of the rotor, a reasonable speed range storage portion for storing a reasonable range of rotating speed of the rotor and the profile setting portion for setting the light load profile as the drive pulse profile by judging that the load for driving the rotor is too light to resonate if the rotating speed in the period for which the stepping motor is rotated at the number of rotations close to the resonance frequency of the stepping motor is out of the reasonable range.

In the image forming apparatus according to the aspect of the invention described above, the rotating speed detection portion detects the rotating speed of the rotor. The reasonable speed range storage portion stores a reasonable range of rotating speed of the rotor. The profile setting portion sets the light load profile as the drive pulse profile if the rotating speed in the period for which the stepping motor is rotated at the number of rotations close to the resonance frequency of the stepping motor is out of the reasonable range.

Accordingly, when there is a step-out or a symptom of step-out because the load is too light, the appropriate drive pulse profile may be set according to the load, whereby the step-out may be reduced.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

The entire disclosure of Japanese Patent Application No. 2005-236740 filed on Aug. 17, 2005 including specification, claims, drawings and abstract is incorporated herein by reference in its entirely.

What is claimed is:

1. An image forming apparatus comprising:
   a stepping motor that drives a rotor by rotating in accordance with an input of a drive pulse;
   a drive pulse profile storage portion that stores the drive pulse profiles corresponding to temporal changes of the drive pulse inputted in the stepping motor at starting, the drive pulse profile storage portion storing at least a first load profile corresponding to the first drive pulse profile for a first load driving the rotor and a second load profile corresponding to the second drive pulse profile for a second load driving the rotor, which is larger than the first load; and
   a profile setting portion that sets the drive pulse profile in accordance with the load for driving the rotor, as the drive pulse profile of pulses inputted into the stepping motor, among the drive pulse profiles stored in the drive pulse profile storage portion.

2. The image forming apparatus according to claim 1, further comprising:
   a rotation detection sensor that detects a rotation state of the rotor;
   a starting failure discrimination portion that discriminates whether or not the stepping motor steps out and the starting of the stepping motor fails, based on the detection result of the rotation detection sensor,
   wherein the profile setting portion sets the drive pulse profile appropriate according to the load when the starting of the stepping motor fails.

3. The image forming apparatus according to claim 2 further comprising:
   a rotational load member that applies a load to prevent the rotor from being driven and rotated; and
   a load member exchange discrimination portion that discriminates whether or not the rotational load member is exchanged,
   wherein the profile setting portion sets the second load profile as the drive pulse profile when the rotational load member is exchanged.

4. The image forming apparatus according to claim 3, further comprising:
   a drive time counter that counts the drive time of the rotor since the rotational load member is exchanged; and
   a load variation time storage portion that stores the load variation time that is the timing at which the drive pulse profile is changed because the load of the rotational load member is decreased over the course of time,
   wherein the profile setting portion sets the first light load profile as the drive pulse profile if the accumulated drive time counted by the drive time counter is greater than the load variation time.

5. The image forming apparatus according to claim 2, further comprising:
   a rotating speed detection portion that detects the rotating speed of the rotor; and
   a reasonable speed range storage portion that stores a reasonable range of rotating speed of the rotor,
   wherein the profile setting portion sets the first load profile as the drive pulse profile if the rotating speed in the period for which the stepping motor is rotated at the number of rotations close to the resonance frequency of the stepping motor is out of the reasonable range.

6. The image forming apparatus according to claim 1 further comprising:
   a rotational load member that applies a load to prevent the rotor from being driven and rotated; and
   a load member exchange discrimination portion that discriminates whether or not the rotational load member is exchanged,
   wherein the profile setting portion sets the second load profile as the drive pulse profile when the rotational load member is exchanged.

7. The image forming apparatus according to claim 6, further comprising:

a drive time counter that counts the drive time of the rotor since the rotational load member is exchanged; and a load variation time storage portion that stores the load variation time that is the timing at which the drive pulse profile is changed because the load of the rotational load member is decreased over the course of time, wherein the profile setting portion sets the first light load profile as the drive pulse profile if the accumulated drive time counted by the drive time counter is greater than the load variation time.

* * * * *